United States Patent
Smithanik et al.

(10) Patent No.: US 9,696,183 B2
(45) Date of Patent: Jul. 4, 2017

(54) ANGULAR POSITION DETECTOR INCLUDING A VARIABLE RELUCTANCE RESOLVER-ENCODER

(71) Applicants: Jeffrey R Smithanik, Calgary (CA); Timothy A Harrris, Calgary (CA); Gregory W Smith, Calgary (CA); Udell So, Calgary (CA); Eric B Mazzei, Calgary (CA)

(72) Inventors: Jeffrey R Smithanik, Calgary (CA); Timothy A Harrris, Calgary (CA); Gregory W Smith, Calgary (CA); Udell So, Calgary (CA); Eric B Mazzei, Calgary (CA)

(73) Assignee: SKF MAGNETICS BEARINGS, Calgary (CA)

( * ) Notice: Subject to any disclaimer, the term of this patent is extended or adjusted under 35 U.S.C. 154(b) by 362 days.

(21) Appl. No.: 14/200,705

(22) Filed: Mar. 7, 2014

(65) Prior Publication Data

US 2015/0253153 A1   Sep. 10, 2015

(51) Int. Cl.
*G01B 7/30* (2006.01)
*G01D 5/20* (2006.01)

(52) U.S. Cl.
CPC .................. *G01D 5/2013* (2013.01)

(58) Field of Classification Search
CPC ........... G01D 5/12; G01D 5/2013; G01B 7/30
USPC .......................... 324/207.2–207.25, 173–174
See application file for complete search history.

(56) References Cited

U.S. PATENT DOCUMENTS

| | | | | |
|---|---|---|---|---|
| 3,930,201 A | * | 12/1975 | Ackermann | F02P 5/15 307/106 |
| 4,697,168 A | * | 9/1987 | Baker | G01L 3/109 341/15 |
| 4,785,242 A | * | 11/1988 | Vaidya | G01P 3/488 310/68 B |
| 4,810,967 A | * | 3/1989 | Yokoyama | F02D 41/009 123/146.5 A |
| 4,893,075 A | | 1/1990 | Dierker, Jr. | |
| 5,444,368 A | * | 8/1995 | Horber | H02K 7/20 310/168 |
| 5,476,272 A | * | 12/1995 | Hixson, II | G01P 3/443 277/317 |
| 5,777,465 A | * | 7/1998 | Walter | G01D 5/147 123/146.5 A |

(Continued)

*Primary Examiner* — Jay Patidar
(74) *Attorney, Agent, or Firm* — Mark Ussai; SKF USA Inc. Patent Dept.

(57) ABSTRACT

An angular position detector includes a cylindrical rotor having an axis of rotation and a first ring with a plurality of alternating teeth and valleys, a first first-ring magnetic sensor having a sensor surface facing the first ring, the first first-ring magnetic sensor being configured to produce a first signal in response to movement of the first ring past the first first-ring magnetic sensor, a second first-ring magnetic sensor having a sensor surface facing the first ring and being configured to produce a second signal in response to movement of the first ring past the second first-ring magnetic sensor, the second first-ring magnetic sensor being circumferentially offset from the first first-ring magnetic sensor by a first angle and a controller operatively connected to the first and second first-ring magnetic sensors and configured to produce a first output signal based on the first and second signals.

7 Claims, 10 Drawing Sheets

(56) References Cited

U.S. PATENT DOCUMENTS

| | | | |
|---|---|---|---|
| 5,825,176 A | 10/1998 | Babin et al. | |
| 5,841,276 A * | 11/1998 | Makino | G01P 3/488 324/207.21 |
| 6,243,023 B1 * | 6/2001 | Katagiri | G01D 3/022 318/661 |
| 6,356,076 B1 * | 3/2002 | Luetzow | G01D 5/2451 324/207.21 |
| 6,538,429 B2 * | 3/2003 | Schroeder | G01D 5/145 310/68 B |
| 6,550,150 B1 * | 4/2003 | Shirai | G01C 1/02 324/207.21 |
| 6,727,689 B1 * | 4/2004 | Furlong | G01D 5/2448 324/166 |
| 6,815,944 B2 * | 11/2004 | Vig | G01D 5/145 324/179 |
| 6,930,423 B2 | 8/2005 | Kitazawa | |
| 7,208,944 B2 | 4/2007 | Tatschl et al. | |
| 7,619,406 B2 * | 11/2009 | Voisine | G01D 5/247 324/207.25 |
| 7,816,912 B2 | 10/2010 | Kikuchi et al. | |
| 7,868,504 B2 | 1/2011 | Kataoka et al. | |
| 8,400,096 B2 * | 3/2013 | Miyashita | G01D 5/145 318/602 |
| 8,575,920 B2 * | 11/2013 | Ausserlechner | G01D 5/145 324/174 |
| 8,624,588 B2 * | 1/2014 | Vig | G01P 3/488 324/173 |
| 8,860,404 B2 * | 10/2014 | Dwyer | G01R 33/072 324/207.2 |
| 2003/0173955 A1 * | 9/2003 | Uenoyama | G01D 5/142 324/207.21 |
| 2003/0218126 A1 * | 11/2003 | Shiba | B62D 6/10 250/231.13 |
| 2006/0076950 A1 * | 4/2006 | Pavan | G01P 3/487 324/207.22 |
| 2009/0302789 A1 * | 12/2009 | Waldenmeier | H02P 29/021 318/400.04 |
| 2011/0115481 A1 * | 5/2011 | Katou | G01D 5/04 324/207.25 |
| 2012/0113283 A1 * | 5/2012 | Kiyamura | G03B 3/10 348/220.1 |
| 2013/0009631 A1 * | 1/2013 | Tsuge | G01D 5/2046 324/207.18 |
| 2013/0057261 A1 | 3/2013 | Odaka | |

* cited by examiner

ANGULAR POSITION DETECTOR INCLUDING A VARIABLE RELUCTANCE RESOLVER-ENCODER

TECHNOLOGICAL FIELD

The present disclosure is directed to a variable reluctance resolver-encoder, and, more specifically, toward a variable reluctance resolver-encoder having a rotor and sensors configured to function at high rotational speeds and/or in a high-radiation environment.

BACKGROUND OF THE DISCLOSURE

It is often desirable to measure the angular position of a rotatable shaft with a high level of precision—to a fraction of a degree, for example, and many conventional resolvers and encoders can provide this level of precision. In general, such devices either include a) semiconductor elements, found in Hall effect sensors, for example, or b) optical elements such as lasers or lenses or glass elements. Such elements will not function and/or will not last long in certain environments. For example, certain high radiation environments can damage semiconductor elements as well as the optical elements in an optical encoder system.

A high-radiation environment in which precise angular measurements are required is the region of the rotating shaft portion of a neutron chopper. Neutron choppers are mechanical devices that include a rotating mass of neutron-blocking or absorbing material, with one or more through openings. The mass of neutron-blocking or absorbing material is sufficient to substantially block a beam of neutrons, and the rotational speed of the mass (or the shaft supporting the mass) is controllable so that the openings are aligned with the beam of neutrons at precisely determined times in order to let through carefully calibrated bursts of neutrons. Often, the rotation of the shaft that supports the rotating mass must be synchronized with a clock or other timing signal. The timing signal, for example, might control both the production of neutrons and the movement of the neutron chopper and/or other operations in a facility requiring controllable bursts of neutrons.

Many conventional resolvers and encoders are not well-suited for use in the environment in which a neutron chopper operates. In addition to the radiation in the form of the neutron beam, the high rotation speed of the chopper (30,000 to 40,000 RPM, for example) can damage delicate sensor components. These elements must therefore be provided with adequate shielding or be replaced when they wear out prematurely.

A variable reluctance sensor is a good candidate for measuring shaft position in such environments. Variable reluctance sensors generally include a permanent magnet sensor core around which a conductive wire is wrapped. Changes in the magnetic flux produced by the sensor core affect a current flow in the wire wrapped around the magnet. The path of the magnetic flux may be affected by moving a body of ferromagnetic material toward and away from the sensor core. Placing a body of ferromagnetic material near the magnet concentrates the flux path in the body of material because the body exhibits a lower reluctance than the surrounding air. Moving the body of ferromagnetic material away from the sensor core increases the reluctance of the flux path and also affects a current flowing in the wire that surrounds the sensor. Alternatively, the sensor could be constructed of a non-magnetized ferromagnetic core, also with a conductive wire wrapped about it, rather than a permanent magnet core. In this alternative, an electrical current is passed through the coil, and is likewise affected by relative motion away or towards the sensor of an adjacent ferromagnetic body.

The body of ferromagnetic material that moves toward and away from the sensor core may be a wheel or gear having teeth. As the wheel or gear rotates, teeth approach, move past, and move away from the magnetic sensor. This causes the magnetic flux to vary in a regular manner, and this variation produces a regular signal in the wire surrounding the permanent magnet. This signal is provided to a controller that, by counting peaks in the signal, for example, can be used as part of a resolver to measure the movement of the gear and thus the shaft to which it is attached. Knowing the number of teeth on the gear allows the speed and position of the gear to be determined by conventional measurement circuits. The portion of such sensors that is exposed to radiation and/or the harsh environments found in neutron choppers constitutes merely ferromagnetic materials and wire. These components are not adversely affected by radiation and thus are good candidates for angular position sensors. It would therefore be desirable to provide an improved angular position detector based on variable reluctance sensors that is adapted for use in a high radiation environment and that can provide sub-degree measurement accuracy.

SUMMARY

These and other problems are addressed by embodiments of the present disclosure, a first aspect of which comprises an angular position detector that includes a cylindrical rotor having an axis of rotation and a first ring comprising a plurality of alternating teeth and valleys. The angular position detector also includes a first first-ring magnetic sensor having a sensor surface facing the first ring and spaced from the rotor by a first gap. The first first-ring magnetic sensor is configured to produce a first signal in response to movement of the first ring past the first first-ring magnetic sensor. The angular position detector also includes a second first-ring magnetic sensor having a sensor surface facing the first ring and spaced from the rotor by a second gap, the second first-ring magnetic sensor being configured to produce a second signal in response to movement of the first ring past the second first-ring magnetic sensor. The second first-ring magnetic sensor is circumferentially offset from the first first-ring magnetic sensor by a first angle. The angular position detector also includes a controller operatively connected to the first and second first-ring magnetic sensors and configured to produce a first output signal based on the first and second signals.

Another aspect of the disclosure comprises an angular position detector that includes a cylindrical rotor having an axis of rotation, the cylindrical rotor further including a first ring comprising a plurality of alternating teeth and valleys and a second ring comprising a plurality of alternating teeth and valleys axially adjacent the first ring. The teeth of the second ring are circumferentially offset from the teeth of the first ring, and the detector includes a third ring. The angular position detector also includes a first first-ring magnetic sensor having a sensor surface facing the first ring and spaced from the rotor by a first gap, the first first-ring magnetic sensor being configured to produce a first signal in response to movement of the first ring past the first first-ring magnetic sensor and a second first-ring magnetic sensor having a sensor surface facing the first ring and spaced from the rotor by a second gap, the second first-ring magnetic sensor being configured to produce a second signal in response to movement of the first ring past the second first-ring magnetic sensor. The second first-ring magnetic sensor is circumferentially offset from the first first-ring magnetic sensor by about 180°. The angular position detector also includes a first second-ring magnetic sensor facing the second ring and spaced from the second ring by a first space, the first second-ring magnetic sensor being configured to produce a third signal in response to movement of the second ring past the first second-ring magnetic sensor and a second second-ring magnetic sensor facing the second ring and spaced from the second ring by a second space, the second second-ring magnetic sensor being configured to produce a fourth signal in response to movement of the second ring past the second second-ring magnetic sensor. The second second-ring magnetic sensor is circumferentially offset from the first second-ring magnetic sensor by about 180 degrees. The angular position detector also includes a first third-ring sensor facing the third ring and a controller operatively connected to the first and second first-ring magnetic sensors and to the first and second second-ring magnetic sensors and to the first third-ring magnetic sensor. The controller is configured to produce a first output signal based on a first pair of the first, second, third and fourth signals and a second output signal based on a second pair of the first, second, third and fourth signals. The rotor and the first and second first-ring magnetic sensors and the first and second second-ring magnetic sensors are configured such that, in the presence of constant angular motion of the first and second rings past the magnetic sensors, a sum or difference of the first and second output signals remains constant independently of changes in the first signal or the second signal or the third signal or the fourth signal.

An additional aspect of the disclosure is an angular position detector that includes a cylindrical rotor having an axis of rotation, the cylindrical rotor including a ring comprising a first number of teeth having a pitch and a second number of valleys between adjacent pairs of the teeth, where each of the teeth has a tooth circumferential length and each of the valleys has a valley circumferential length equal to the tooth circumferential length. The detector also includes a first magnetic sensor having a sensor surface facing the ring and configured to produce a first sensor signal in response to movement of the first ring past the first magnetic sensor, a maximum width of the first sensor surface in a plane perpendicular to the axis of rotation being substantially the same as the tooth circumferential length and a controller operatively connected to the first magnetic sensor and configured to receive a first periodically varying signal from the first magnetic sensor and output a first resolver output signal and a first pulsed encoder output based on the first sensor signal.

BRIEF DESCRIPTION OF THE DRAWINGS

These and other aspects and features of embodiments of the disclosure will be better understood from a reading of the following detailed description in connection with the attached drawings, wherein.

DETAILED DESCRIPTION

Figure 1:
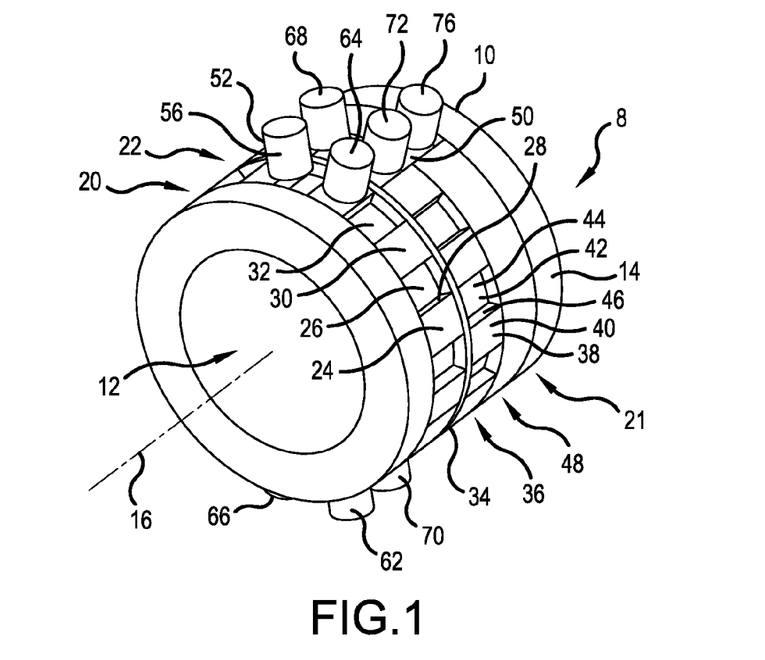
FIG. 1 is perspective view schematically illustrating an angular position detector having a rotor and a plurality of sensors according to an embodiment.
Figure 2:
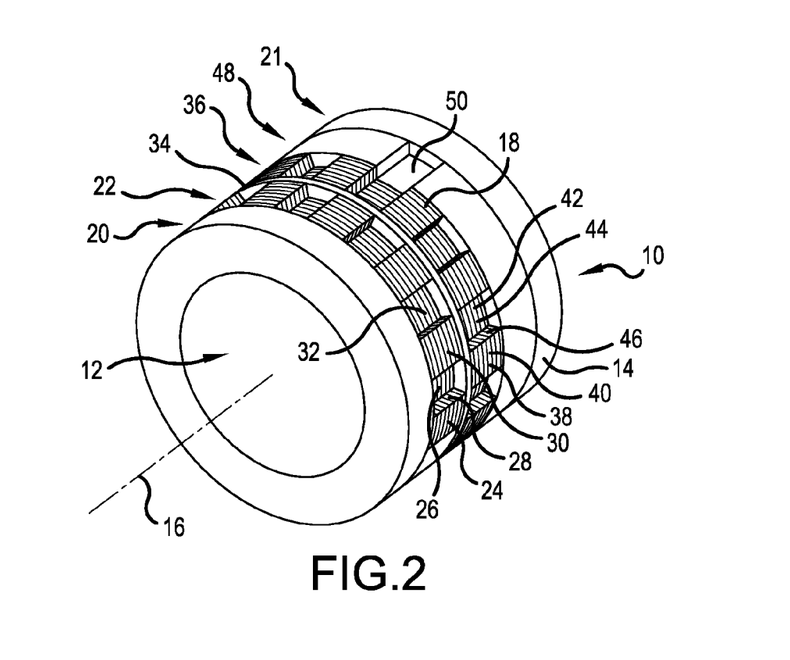
FIG. 2 is a perspective view of the rotor of FIG. 1 without the sensors.

Referring now to the drawings, wherein the showing are for the purpose of illustrating presently preferred embodiments of the disclosure only and not for the purpose of limiting same, FIG. 1 shows an angular position detector 8 that includes a rotor 10 having a central bore 12 and a cylindrical outer surface 14 both of which are symmetrically disposed about an axis of rotation 16. The rotor 10, shown by itself in FIG. 2, is formed of a body of ferromagnetic material, portions of which may comprise laminations 18 of sheet steel which have been laser-cut or otherwise shaped to form the rotor features described below and bonded together in a conventional manner into a unitary body.

In the following discussion, circumferentially extending portions of the rotor at axially different locations may be referred to as "rings" of the rotor. The term "ring" is used merely to distinguish one circumferential portion of the rotor from another and is not intended to require any particular structure of the ring; for example, the term "ring" does not require that either the inner or outer surface of the ring be cylindrical although such cylindrical ring portions are possible and included within the scope of this disclosure. The rings may also include teeth that project above a cylindrical surface and/or depressions into a cylindrical surface and/or any of the other structures discussed below.

The rotor 10 includes a left axial end ring 20 and a right axial end ring 21 that have smooth outer surfaces, and the left and right axial end rings 20, 21 form axial end portions of the cylindrical rotor outer surface 14. The terms "left" and "right" are used with reference to the orientation of the rotor 10 in the figures as a matter of convenience to distinguish one end of the rotor 10 from the other; in use, the left axial end ring 20 of the rotor 10 could face in any direction.

The rotor 10 further includes a first ring 22 axially inward of the left axial end 20, and the first ring 22 has a plurality of alternating teeth 24 and valleys 26 which teeth 24 and valleys 26 share common, radially extending side walls 28. In the embodiment discussed herein, the teeth 24 have cylindrically curved tops 30 centered on the axis of rotation 16 of the rotor 10 and which are axially flush with the outer surface of the left axial end ring 20; however, the teeth 24 and their tops 30 could alternately be located radially above or below the cylinder defined by the left axial end ring 20, and/or the tooth tops 30 could be substantially planar or have a cylindrical curvature that is not centered on the axis of rotation 16 of the rotor 10 without exceeding the scope of the present disclosure. Likewise, in the present embodiment, the valleys 26 comprise cylindrically curved bottoms 32 which are located radially inwardly of the cylindrical outer surface 14 of the rotor 10 and which are centered on the axis of rotation 16, but the valley 26 could alternately comprise planar surfaces and/or cylindrical surfaces that are not centered on the axis of rotation 16. In such alternatives, the exterior of the rotor 10 could look generally similar to a gear. In any case, the tooth tops 30 are all located a first radial distance from the axis of rotation 16 and the valley bottoms 32 are all located a second radial distance from the axis of rotation 16 that is less than the first distance. The first ring 22 is preferably formed from a plurality of the thin laminations 18.

In the present disclosure, the teeth 24 and valleys 26 are defined by radially outer portions of the laminations 18, and thus the valleys 26 are open to ambient air. However, as will become apparent from the following discussion, the purpose of the teeth 24 and valleys 26 is to provide regions having different magnetic reluctances. Therefore, the valleys 24 could be partly or completely filled with a material having a different reluctance than the sheet steel that forms the teeth 24. Such circumferentially alternating regions of different reluctance are intended to be included within the description of "teeth" and "valleys" even though they may present the outward appearance of a uniform cylinder rather than a cylinder with visibly apparent teeth and valleys.

The rotor 10 includes a spacer ring 34 adjacent to the first ring 22 on the side of the first ring 22 opposite from the left axial end ring 20. The spacer ring 34 may be substantially axially thinner than the left axial end ring 20 and the first ring 22 and comprise, for example, one or two annular laminations 18.

On the opposite side of the spacer ring 34 from the first ring 22 is a second ring 36, also formed of the laminations 18. The second ring 36 comprises a plurality of alternating teeth 38 having tops 40 and valleys 42 having bottoms 44 which teeth 38 and valleys 42 share common, radially extending side walls 46. The teeth 38 and valleys 42 of the second ring 36 are structurally identical to the teeth 24 and valleys 26 of the first ring 22 and may be modified in the same manner as the teeth 24 and valleys 26 of the first ring 22. In this embodiment, the teeth 38 of the second ring 36 are rotationally or circumferentially offset from the teeth 24 of the first ring 22, and the radial side walls 28 of the first ring 22 are axially aligned with the radial side walls 46 of the second ring 36. In other words, the teeth 24 the first ring 22 are axially aligned with the valleys 42 of the second ring 36, and the valleys 26 of the first ring 22 are axially aligned with the teeth 38 of the second ring 36. However, the teeth 24 of the first ring 22 could partially or completely overlap the teeth 38 of the second ring 36 without exceeding the scope of this disclosure. While only the first and second rings are described herein as being formed of laminations, the use of laminations is not required. All rings could be solid or any or all rings could be formed of laminations without exceeding the scope of the present disclosure.

A third ring 48 is located between the second ring 36 and the right axial end ring 22 and includes only a single valley 50 which is preferably aligned with one of the valleys 42 of the second ring 36. The remainder of the third ring 48 is a cylindrical surface 52 centered on the axis of rotation 16 and forming a portion of the outer cylindrical surface 14 along with the outer surfaces of the left and right axial end rings 20, 22 and the tops 30 of the teeth 24 of the first ring 22 and the tops 40 of the teeth 38 of the second ring 36. The third ring 48 may be located directly adjacent to the second ring 36 as illustrated in the drawings or an optional second spacer ring (not illustrated) may be present. The single valley 50 may alternatively be replaced by a single tooth (not illustrated), which is preferably aligned with one of the teeth 38 of the second ring 36. As a further alternative, the third ring may include any structure that generates a signal once per revolution of the rotor 10 which structure has a circumferential extent less than the pitch of the teeth 24 of the first ring 22. Such a structure (or a single tooth or a single valley) may be referred to herein as a target. Thus, while a single tooth or valley is generally preferred as a target a plurality of small teeth and/or valleys and/or other structures that will affect the flux path of a sensor could also be used as target.

Figure 3:
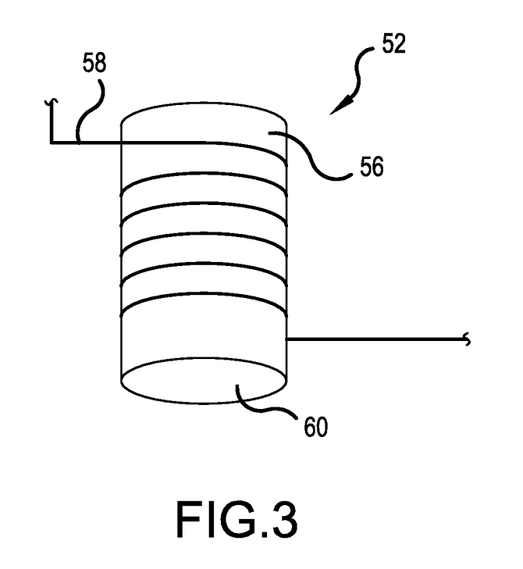
FIG. 3 is a perspective view of one of the sensors of FIG. 1.
Figure 4:
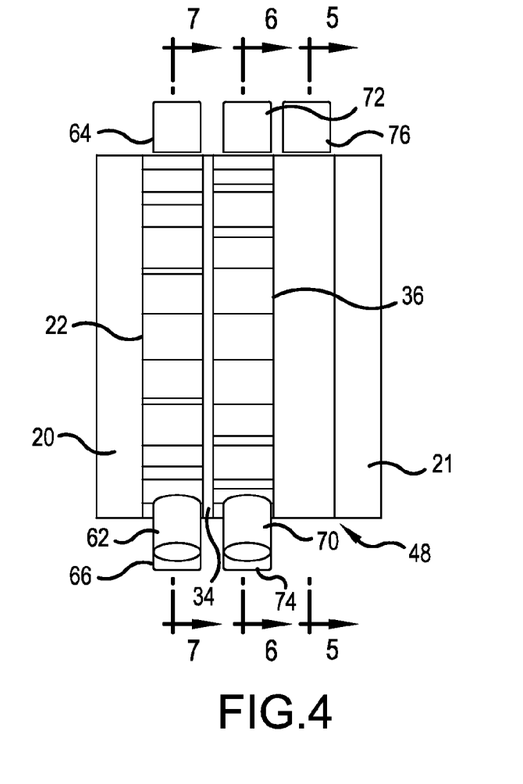
FIG. 4 is a side elevational view of the rotor and sensors of FIG. 1.

The angular position detector 8 also includes a plurality of sensors associated with each of the first, second and third rings 22, 36 and 48. These sensors are described herein as "first-ring sensors," "second-ring sensors" and "third-ring sensors" to identify their relative axial position relative to the rotor—a first first-ring sensor 52, for example, overlies the first ring 22 and is spaced from the first ring 22 by a first gap 54 as shown in FIG. 4. As shown in detail in FIG. 3, the first first-ring sensor 52 comprises a cylindrical body 56 of ferromagnetic material having a wire 58 wrapped therearound. The other sensors described herein are also wrapped with the wire 58 or a similar wire, but for purposes of illustration, the wire 58 is only illustrated in the detail view of FIG. 3. The first first-ring sensor 52 has a substantially circular sensor surface 60 that faces the teeth 24 and valleys 26 of the first ring 22 across the first gap 54. In the present embodiment, the sensor surface 60 is substantially planar and has a diameter approximately equal to the circumferential length of one of the teeth 24 which length is also substantially the same as the circumferential length of one of the valleys 26.

A second first-ring sensor 62 is angularly spaced from the first first-ring sensor 52 by a first angle, which in the present embodiment is 180 degrees, and the second first-ring sensor 62 is spaced from the first ring 22 by the same first gap 54 as the first first-ring sensor 52. A third first-ring sensor 64 is angularly spaced from the first first-ring sensor 52 by a second angle, which second angle is selected such that, when the first first-ring sensor 52 is directly aligned with (lies completely over) one of the teeth 24 of the first ring 22, the third first-ring sensor 64 lies half way between a tooth 24 and a valley 26 of the first ring 22. In the present embodiment, in which the first ring 22 includes 12 teeth, the teeth 24 are angularly spaced by and have a pitch of 30 degrees. The third first-ring sensor 64 is spaced from the first first-ring sensor 52 by 0.75 times the pitch or by 22.5 degrees. More generally, the third first-ring sensor 64 can be spaced from the first first-ring sensor 52 by 0.75n times the tooth pitch where n is an integer greater than or equal to 1. A fourth first-ring sensor 66 is also provided which is angularly spaced from the third first-ring sensor 64 by the same first angle as the spacing between the first first-ring sensor 52 and the second first-ring sensor 62, in this case by 180 degrees.

Four second-ring sensors are associated with the second ring 36 and include a first second-ring sensor 68 and a second second-ring sensor 70 angularly offset from the first second-ring sensor 68 by the first angle—180 degrees. A third second-ring sensor 72 is angularly offset from the first second-ring sensor 68 by a second angle, 22.5 degrees, and which may be offset from the first second-ring sensor 68 by an integral multiple of 0.75 times the pitch of the teeth of the second ring 36. A fourth second-ring sensor 74 is angularly offset from the third second-ring sensor 72 by the same first angle, 180 degrees.

Figure 5:
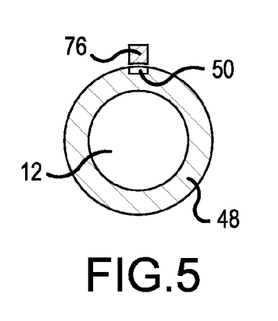
FIG. 5 is a sectional elevational view through line 5-5 in FIG. 4.
Figure 6:
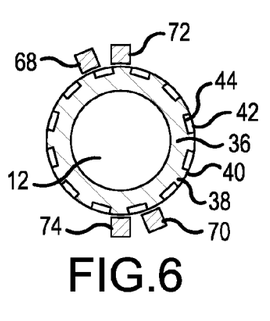
FIG. 6 is a sectional elevational view through line 6-6 in FIG. 4.
Figure 7:
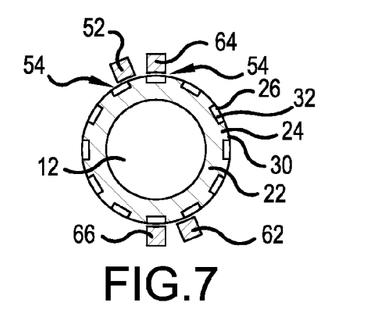
FIG. 7 is a sectional elevational view through line 7-7 in FIG. 4.

One third-ring sensor is also provided—a first third-ring sensor 76. FIG. 4 shows the rotor 10 from the side and the relative locations of the second first-ring sensor 62, the fourth first-ring sensor 66, the second second-ring sensor 70, the fourth second-ring sensor 74 and the third-ring sensor 76. FIGS. 5, 6 and 7 are sectional side elevational views through the third ring 48, the second ring 36 and the first ring 22, respectively, further illustrating the relative locations of the first through fourth first-ring sensors 52, 62, 64, 66, the first through fourth second-ring sensors 68, 70, 72, 74 and the first third ring sensor 76.

The operation of the first first-ring sensor 52 is discussed below in connection with FIG. 3; the other sensors operate in the same manner. When a current flows through the coil formed by the wire 58 wrapped around the cylindrical body 56, a magnetic flux forms in the center of the coiled wire 58 which is concentrated in the ferromagnetic cylindrical body 56, and this flux follows a path that extends from one end of the cylindrical body 56, curves back along the side wall of the cylindrical body 56 and returns to the other end of the cylindrical body 56. Part of the flux path thus flows through the cylindrical body 56 itself and the rest passes through the air surrounding the cylindrical body 56. Those ordinarily skilled in the art will see that the cylindrical body of the sensor may preferably take other shapes. The ferromagnetic body 56 has a lower reluctance than the reluctance of the surrounding air. Any additional ferromagnetic material placed into the air portion of the flux path will change the overall reluctance of the flux path.

If the rotor 10 is stationary, the magnetic flux will be constant and will have no effect on a current running through the wire 58. However, moving the alternating teeth 24 and valleys 26 of the rotor 10 past the cylindrical body 56 changes the amount of ferromagnetic material in the flux path and thus changes the reluctance of the path followed by the magnetic flux. The reluctance of the overall flux path is decreased when the low-reluctance teeth 24 are partially or completely radially aligned with the sensor surface 60, and the reluctance of the path is increased when the higher-reluctance valleys 26 are partially or fully radially aligned with the sensor surface 60. The changing reluctance of the flux path affects the current flowing through the wire 58 in a regular manner, and if the number of teeth 24 on the first ring 22 and/or second ring 36 is known, the speed of the rotor 10 can be determined by suitable circuitry for monitoring these periodic changes in the current. The circuitry can be configured to detect fluctuations in either current, voltage, or any other property of the sensor-current system.

In the present embodiment, the diameter of the sensor surface 60 is selected to be substantially the same as the circumferential width of each of the plurality of teeth 24 and valleys 26 of the first ring 22. Thus, the reluctance of the flux path decreases as more and more of one of the teeth 24 comes beneath the first first-ring sensor 52 and reaches a minimum when the top 30 of the tooth 24 and the sensor surface 60 are aligned. The reluctance then begins to increase as the tooth 24 moves out of alignment with the first first-ring sensor 52. The combination of a circular sensor surface 60 and teeth 24 having a circumferential width substantially equal to the diameter of the sensor surface 60 produces a sinusoidal variance in the current in the wire 58 which sinusoidal output signal can be processed in the same manner as the signals produced by conventional resolvers to locate peaks, troughs and/or zero crossings in the signal to determine the rotational speed of the rotor 10. The signal produced by the first first-ring sensor 52 is illustrated as sine signal 102 in FIG. 11. Non-circular sensors, and/or teeth or valleys with non-straight leading and trailing edges, and or a non-uniform tooth pitch will form non-sinusoidal repeating signals, also useful for the measurement of angular position and rotation speed.

The second first-ring sensor 62 is spaced 180 degrees from the first first-ring sensor 52, and thus, for a rotor such as rotor 10 having an even number of teeth 24, will always be aligned with a similar feature of the first ring 22. For example, when the first first-ring sensor 52 is aligned with a tooth 24, the second first-ring sensor 62 will also be aligned with a tooth 24 on the opposite side of the rotor 10.

The second ring 36 is shifted relative to the first ring 22 by one-half of the tooth pitch of the first ring 22 so that the teeth 24 of the first ring 22 are aligned with the valleys 26 of the second ring 36. Because of this offset, signals produced by the first through fourth second-ring sensors 68, 70, 72, 74 are 180 degrees out of phase with the signals produced by the first through fourth first-ring sensors 52, 62, 64, 66, respectively, but have the same mutual relationships (first second-ring sensor 68 to second second-ring sensor 70, etc.) as the signals produced by the first through fourth first-ring sensors 52, 62, 64, 66 and will not be described in detail. The second ring 36 may be offset from the first ring by a different angular amount, by one half a tooth width, for example, without exceeding the scope of this disclosure. The teeth 38 of the second ring 36 could alternately be aligned with the teeth 24 of the first ring 22 and the first through fourth first ring sensors 52, 62, 64, 66 could be circumferentially offset relative to the first through fourth second-ring sensors 68, 70, 72, 74. Substantially any arrangement that allows the second ring 36 to produce signals that are not in phase with the signals from the first ring 22 could be used.

The first through fourth first-ring sensors 52, 62, 64, 66 and first through fourth second-ring sensors 68, 70, 72, 74 output a total of eight sinusoidal signals that can be used to determine the speed and/or angular position of the rotor 10 by counting the numbers of peaks, troughs and/or zero crossings of the analog signals. A particular system for using these signals to produce both an analog resolver signal and a digital encoder signal while substantially cancelling out any effects caused by radial movements of the rotor 10 relative to the sensors is discussed below.

Figure 8:
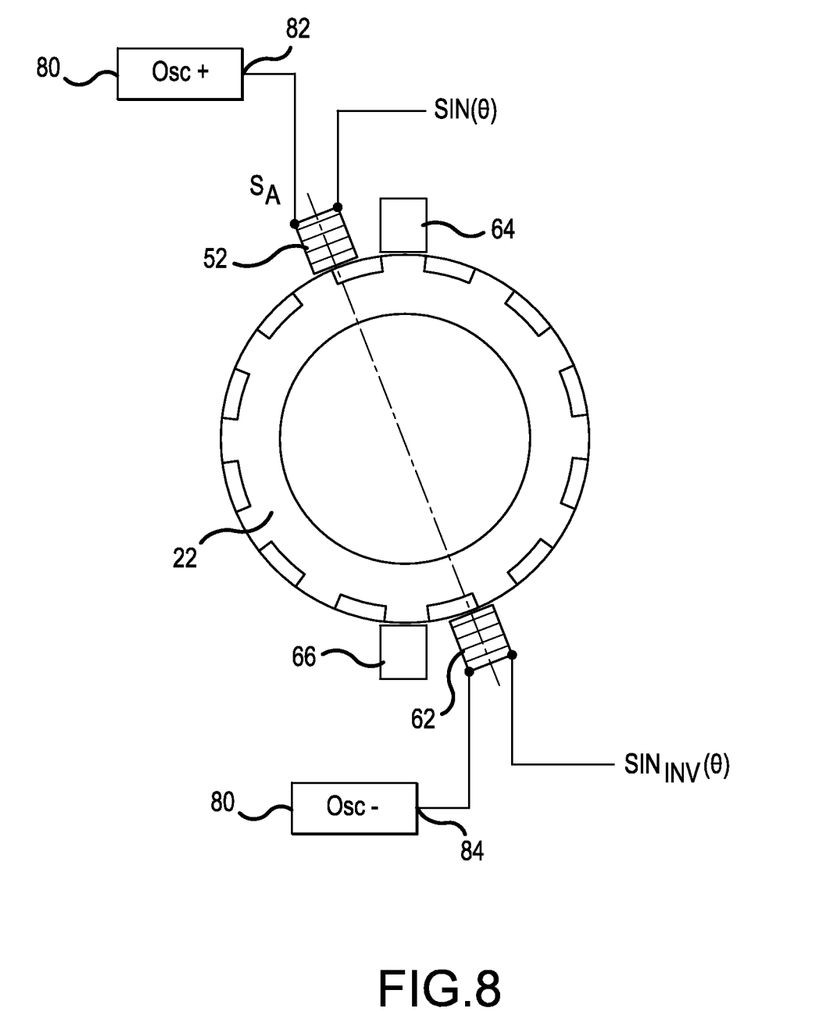
FIG. 8 is a wiring diagram showing a wiring arrangement that includes an oscillator and two of the sensors of FIG. 1.

Before describing presently preferred wiring arrangements for the first through fourth first-ring sensors 52, 62, 64, 66 and first through fourth second-ring sensors 68, 70, 72, 74 described above, it is noted that as the rotor 10 rotates, the spacing 54 between the first ring 22 and the first through fourth first-ring sensors 52, 62, 64, 66 and/or the spacing between the second ring 36 and the first through fourth second-ring sensors 68, 70, 72, 74 may vary. This variance may be caused by vibrations in the shaft (not illustrated) on which the rotor 10 is mounted or by other asymmetric forces on the shaft. If only a single sensor, such as the first first-ring sensor 52, were monitored to determine the position or speed of the rotor 10, the changes in the reluctance occasioned by the changing gap 54 between the first ring 22 and the first first-ring sensor 52 would affect the signal produced by the first first-ring sensor 52 which in turn could affect the accuracy of the position and/or speed measurement. FIG. 8 illustrates conceptually how this variance can be cancelled from a signal, after which presently preferred wiring arrangements for the sensors are described.

Figure 13:
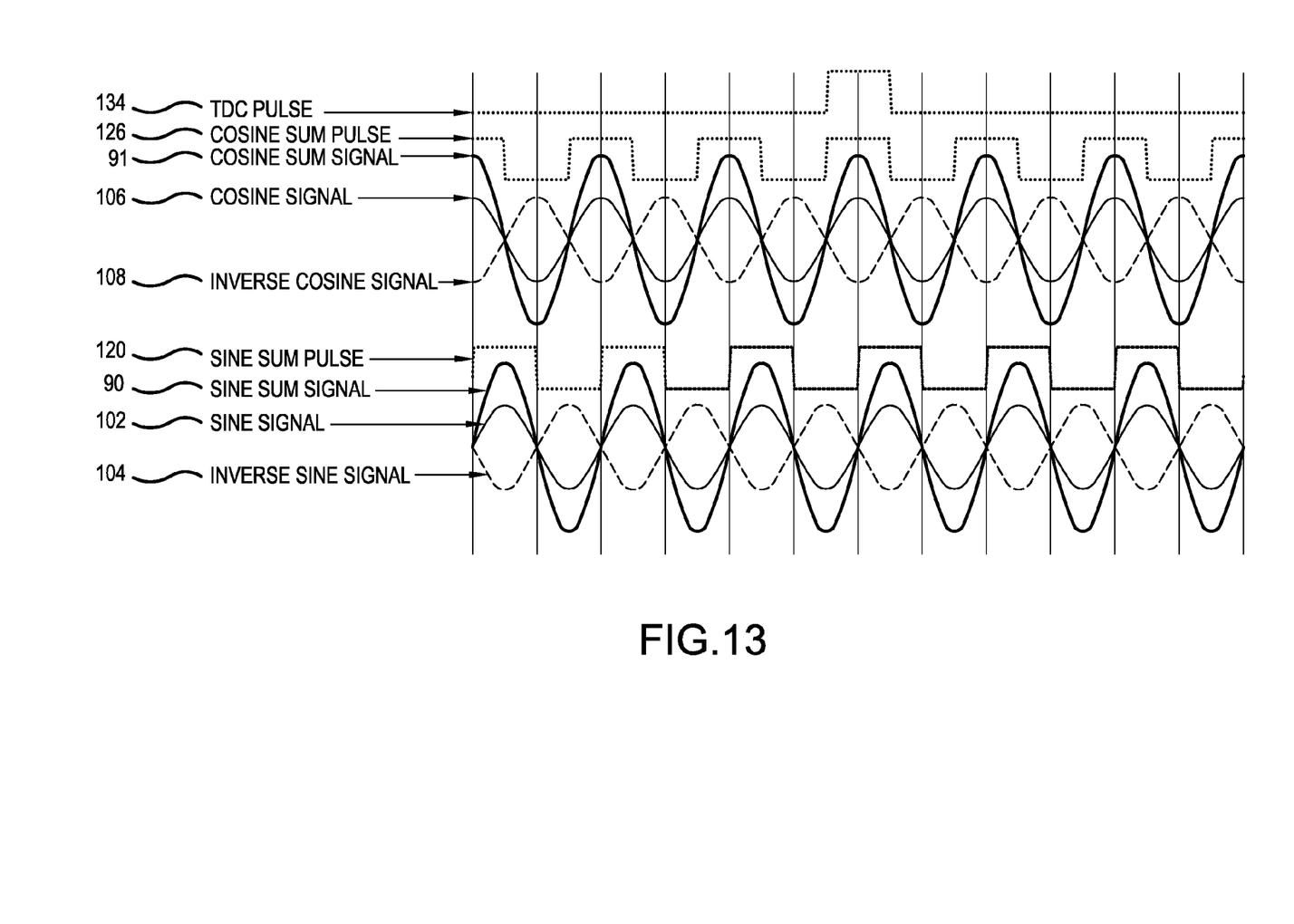
FIG. 13 is a graph of the outputs of the sensors of FIG. 1 and signals derived from those outputs.

FIG. 8 shows the first ring 22 by itself and also includes an oscillator 80 having a positive output 82 and a negative output 84. The signal produced by the positive and negative outputs are mirror images of each other, that is, 180 degrees out of phase. The oscillator signals act as carrier waves and may comprise substantially any periodic signal—the signal will generally be sinusoidal, but could comprise a square or triangular waveform, for example, without departing from the scope of the disclosure. The positive output 82 is connected to the first first-ring sensor 52 and the negative output 84 is connected to the second first-ring sensor 62. As the first ring 22 rotates relative to the first first-ring sensor 52 and the second first-ring sensor 62, sinusoidal signals are generated on the sine output line 92 connected to the first first-ring sensor 52 and on the inverse sine output line 94 connected to the second first-ring sensor 62, which signals are illustrated (after the carrier wave has been removed) as sine signal 102 and inverse sine signal 104 in FIG. 13, respectively. Because the second first-ring sensor 64 is diametrically opposite the first first-ring sensor 52, any radial movement of the rotor 10 that increases the gap 54 between the first ring 22 and the first first-ring sensor 52 will simultaneously decrease the gap 54 between the first ring 22 and the second first-ring sensor 62 by an identical amount. These changes in gap size will also affect the reluctance of the flux paths of the first first-ring sensor 52 and the second first-ring sensor 62 to the same absolute amount, but the amounts will have opposite signs. Thus any increase in reluctance in the flux path of the first first-ring sensor 52 will be offset by an equal but opposite decrease in reluctance in the flux path of the second first-ring sensor 62. Therefore, even when the shaft is not perfectly centered between the first first-ring sensor 52 and the second first-ring sensor 62, the sum of the signals produced by the first and second first-ring sensors 52, 62 will remain constant.

In a similar manner, the third first-ring sensor 64 could be connected to the positive terminal 82 of the oscillator 80 and the fourth first-ring sensor could be connected to the negative terminal 84 of the oscillator 80 to produce a second pair of signals that are 180 degrees out of phase with each other. The signal produced by the third first-ring sensor 64 will be 90 degrees out of phase with the signal produced by the first first-ring sensor 52, and the signal produced by the fourth first-ring sensor 66 will be 90 degrees out of phase with the signal produced by the second first-ring sensor 66, and this second pair of signals can be used to provide confirmation or a greater degree of accuracy when determining a position of the rotor 10 as discussed below. Because the signals produced by the first and second first-ring sensors 52, 62 are 90 degrees out of phase from the signals produced by the third and fourth first-ring sensors 64, 66, the signal produced by the first first-ring sensor 52 may be referred to as a sine signal, the signal produced by the second first-ring sensor 62 may be referred to as an inverse sine signal, the signal produced by the third first-ring sensor 64 may be referred to as a cosine signal and the signal produced by the fourth first-ring sensor 66 may be referred to as an inverse cosine signal.

Two specific wiring arrangements that interconnect the first through fourth first-ring sensors 52, 62, 64, 66 and the first through fourth second-ring sensors 68, 70, 72, 74 are described below in connection with FIGS. 9-11 which arrangements take advantage of the increased sensitivity and resistance to radial motion provided by the use of more than two sensors.

Figure 9:
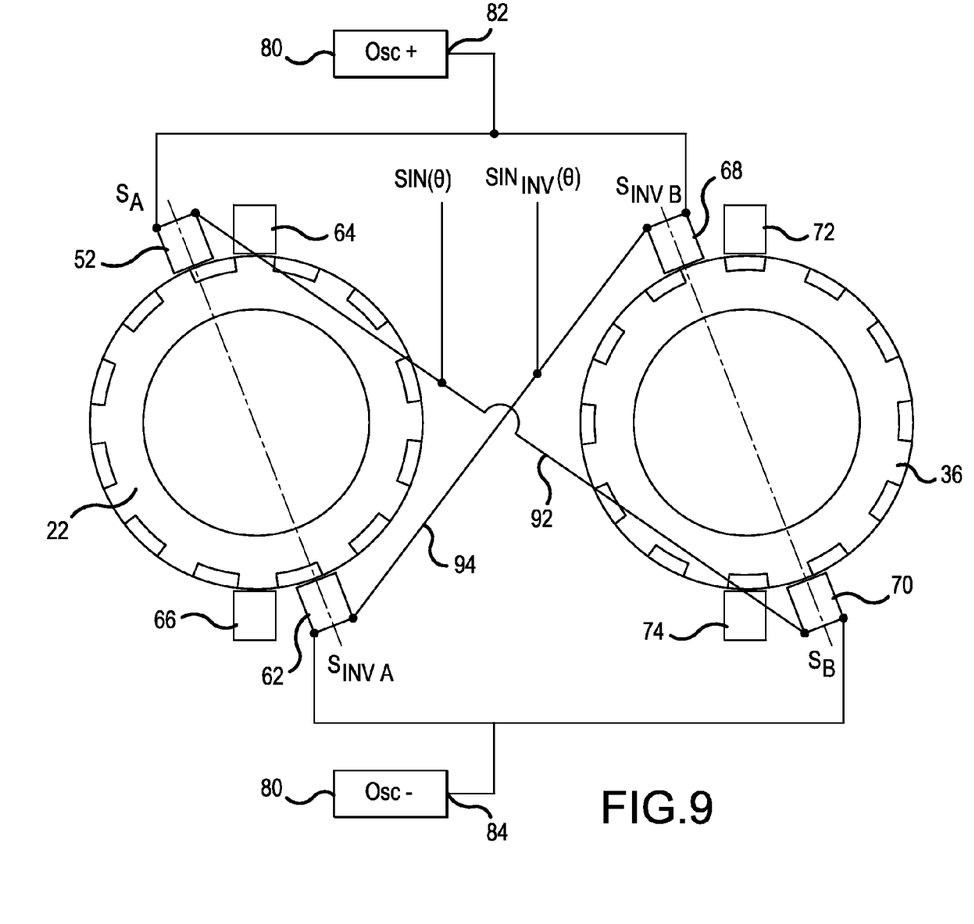
FIG. 9 is an alternate wiring diagram showing connections between a first set of four of the sensors of FIG. 1 and an oscillator.

FIG. 9 illustrates a first wiring arrangement that takes advantage of the presence of multiple sensors associated with the first and second rings 22, 36 to provide signals that can be used to more precisely determine the angular position of the rotor 10. FIG. 9 illustrates the first ring 22 and the second ring 36 of the rotor 10 individually as if they had been cut from the rotor 10 and placed adjacent to one another so that they face in the same direction as they did when they were part of the rotor. As discussed above, the oscillator positive output 82 produces a first signal and the negative output 84 produces a second signal shifted 180 degrees relative to the first signal. These oscillator signals constitute a carrier wave with which the sinusoidal outputs (sinusoidal only in the presence of rotation) of the first ring sensors 52, 62, 64, 66 and the second ring sensors 68, 70, 72, 74 are combined. The sinusoidal signals produced by the first ring sensors 52, 62, 64, 66 and by the second ring sensors 68, 70, 72, 74 are later electronically combined as described above, and then extracted from the carrier wave/oscillator signal in a conventional manner.

In FIG. 9, the positive output 82 of the oscillator 80 is connected to the first first-ring sensor 52, and the output of the negative output 84 of the oscillator 80 is connected to the second second-ring sensor 70. The outputs of the first first-ring sensor 52 and the second second-ring sensor 70 are connected to the sine output line 92 and produce sine signal 102 illustrated in FIG. 11 (after the carrier wave is removed). Assuming clockwise rotation of the first ring 22 and the second ring 36 in FIG. 9, one of the teeth 24 of the first ring 22 is moving into alignment with the first first-ring sensor 52 as one of the teeth 38 of the second ring 36 is moving out of alignment with the second second-ring sensor 70. In addition, the positive output 82 of the oscillator 80 is connected to the first second-ring sensor 68, and the negative output 84 of the oscillator 80 is connected to the second first-ring sensor 62. The outputs of the first second-ring sensor 68 and the second first-ring sensor 62 are connected to the inverse sine output line 94 and produce the inverse sine signal 104 illustrated in FIG. 13 (after the carrier wave is removed). The difference between the sine signal 102 and the inverse sine signal 104 constitutes a sum of the absolute magnitudes of the sine signal 102 and the inverse sine signal 104 waves and is thus identified as a sine sum signal 90 in FIG. 13. Vibrations in the shaft or radial movements of the rotor 10 affect the sine signal 102 and the inverse sine signal 104 in equal and opposite amounts and are therefore cancelled out in the sine sum signal 90. The fact that the sine sum signal 90 is not affected by relative radial motion between the rotor 10 and the sensors allows for a given degree of precision to be maintained with the angular position sensor 8 even when the rotor 10 is subjected to vibrations and/or asymmetric forces.

Figure 10:
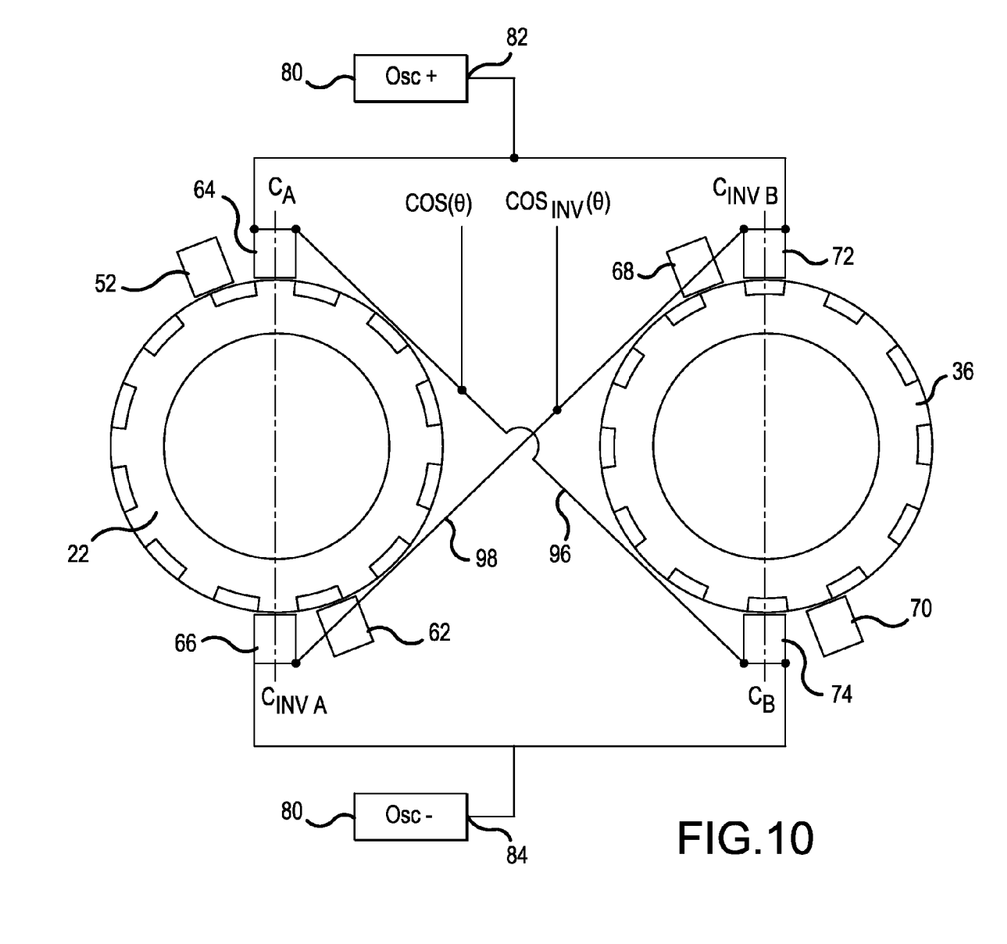
FIG. 10 is a wiring diagram showing connections between a second set of four of the sensors of FIG. 1 and the oscillator.

FIG. 10 shows the wiring of the cosine sensors, that is the third first-ring sensor 64, the fourth first-ring sensor 66, the third second-ring sensor 72 and the fourth second-ring sensor 74. The wiring substantially corresponds to the wiring of the sine sensors 52, 62, 68, 70 discussed above and will not be addressed in detail. However, it should be noted that the output of the third first-ring sensor 64 is shifted by 90 degrees relative to the output of the first first-ring sensor 52 or by 0.75n times the pitch of the teeth 24 of the first ring 22. The combined output of the third first-ring sensor 64 and the fourth second-ring sensor 74 appears on a cosine output line 96, producing the cosine signal 106 in FIG. 13, and the combined output of the third second-ring sensor 72 and the fourth first-ring sensor 66 appears on an inverse cosine output line 98, producing the inverse cosine signal 108 in FIG. 13.

Figure 11:
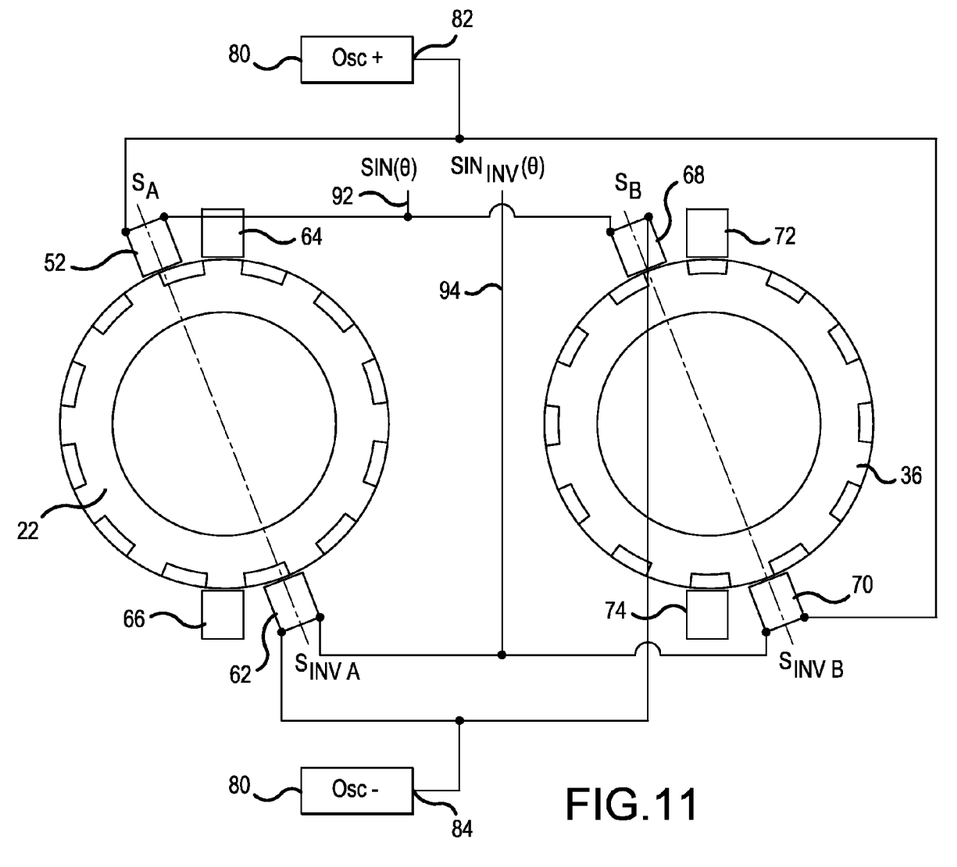
FIG. 11 is an alternative wiring arrangement for the sensors of FIG. 1.

FIG. 11 illustrates an alternate wiring arrangement for the first and second first-ring sensors 52, 62 and the first and second second-ring sensors 68, 70. In FIG. 11, the first first-ring sensor 52 and the second second-ring sensor 70 are both connected to the positive output 82 of the oscillator 80. In addition, the second first-ring sensor 62 and the first second-ring sensor 68 are both connected to the negative output 84 of the oscillator 80. The output of the first first-ring sensor 52 and the first second-ring sensor 68 are combined on the sine output line 92, and the output of the second first-ring sensor 62 and the second second-ring sensor 70 are combined on the inverse sine line 94. The teeth 24 of the first ring 22 are offset from the teeth 38 of the second ring 36 so that the signals produced by the first first-ring sensor 52 and the first second-ring sensor 68 would also be 180 degrees out of phase. However, the oscillator signals applied to the first first-ring sensor 52 and the first second-ring sensor are also 180 degrees out of phase. Therefore the output of the first first-ring sensor 52 and the first second-ring sensor 68 are generally the same and the output on sine output line 92 is approximately twice the signal produced by each of the first first-ring sensor 52 and the first second-ring sensor 68 alone. An inverse signal is produced on the inverse sine output line 94 from the second first-ring sensor 62 and the second second-ring sensor 70 in a similar manner.

As with the embodiment of FIG. 9, using the wiring arrangement of FIG. 11 radial movements of the rotor 10 produce equal and opposite changes to the signals coming from sensors 52 and 68, leaving the signal on line 92 unaffected. Likewise for the signals coming from sensors 62 and 70. Therefore, in the presence of constant angular motion of rotor 10, sine signal on sine line 92 and the inverse sine signal on inverse sine line 94 are substantially constant even if the rotor 10 vibrates or otherwise moves in a radial direction.

Figure 12:
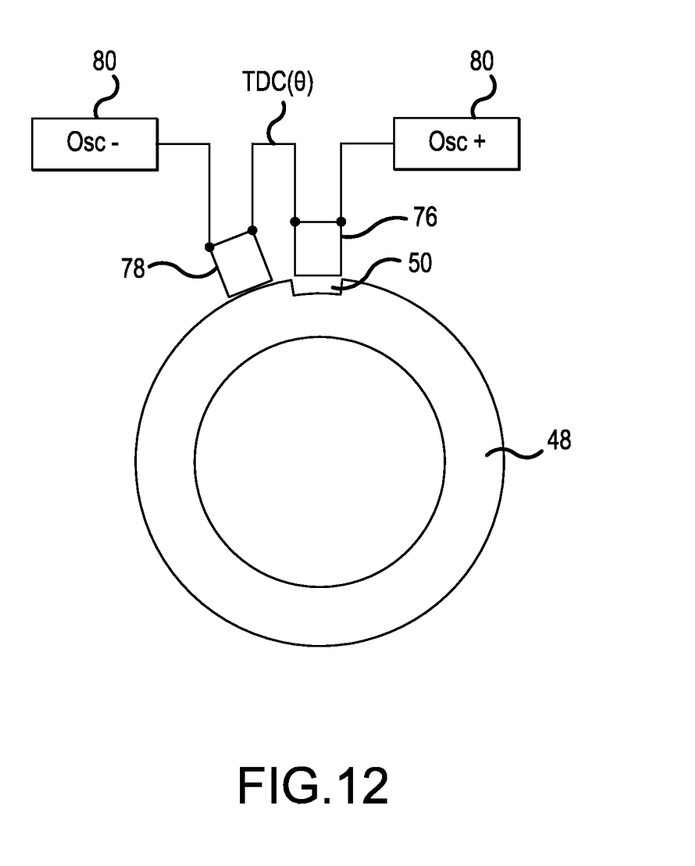
FIG. 12 illustrates a wiring arrangement for one of the rings of FIG. 1.

FIG. 12 shows the third ring 48, the first third-ring sensor 76 illustrated in FIG. 1 and an optional second third ring sensor 78. The first third-ring sensor 76 may be referred to as a "top dead center" or "TDC" sensor and produces an output on TDC output line 79 once each time valley 50 moves into alignment with the first third-ring sensor 76, that is, once per revolution of the rotor 10. Counting the signals from the first third-ring sensor 76 thus provides an indication the number of complete revolutions that have been completed by the rotor 10 in a given period of time.

More importantly, the output of the first third-ring sensor 76 allows the absolute angular position of the rotor 10 to be known. This may be important during an initialization procedure when the rotor 10 is started so that components mounted on the shaft that supports the rotor 10 are in proper position for use. Knowing the absolute position of the shaft also allows the shaft to be stopped in a desired position and provides a periodic indication of the angular orientation of the shaft during use. The second third-ring sensor 78 provides a reference signal that can be compared to the signal from the first third-ring sensor 76 to more easily determine changes in the signal output from the first third ring sensor 76 and thus to determine whether the signal output by the first third-ring sensor 76 at any given time is indicating alignment with the valley 50 of the third ring. Instead of the second third-ring sensor 78, a reference inductance (not illustrated) can be used to provide a static reference signal.

Figure 14:
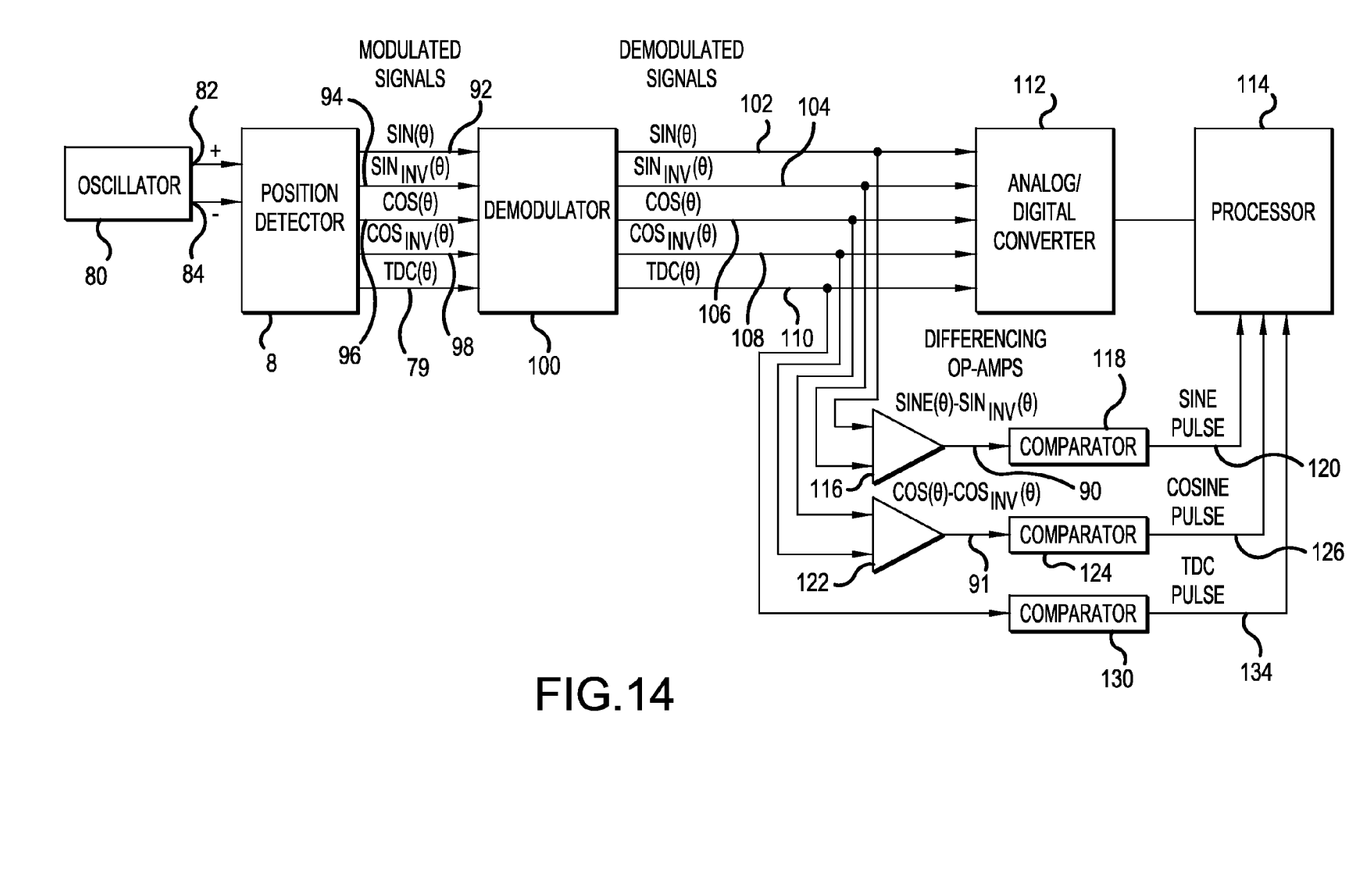
FIG. 14 is a schematic illustration of a control system of the angular position detector of FIG. 1.

FIG. 14 shows the oscillator 80 connected to the position detector 8 and additional elements for processing the signals output by the sensors using the wiring arrangement of FIGS. 9 and 10. A demodulator 100 is provided that receives the modulated signal from the sine output line 92, the inverse sine output line 94, the cosine output line 96, the inverse cosine output 98 and the TDC output line 79 and demodulates these signals, producing a demodulated sine output 102, a demodulated inverse sine output 104, a demodulated cosine output 106, a demodulated inverse cosine output 108 and a demodulated TDC output 110. The demodulator 100, which may be also be referred to as a "controller" may comprise an individual component or part of a microprocessor or software or other control arrangement that performs other signal processing and/or calculations in addition to demodulation. These demodulated signals are provided to an analog-to-digital converter 112 that converts the analog signals to digital signals which are then sent to processor 114. The processor 114 uses the information from the analog signals to derive precise angular information about the position of the rotor 10, in particular, in connection with moving the rotor 10 to a desired starting or stopping position, or accelerating or decelerating the rotor 10 to a desired speed, or synchronizing the rotation of rotor 10 with an external signal.

In addition, the demodulated sine output 102 and demodulated inverse sine output 104 are provided to a first differencing op-amp 116 which produces the sine sum signal 90, and the sine sum signal 90 is provided to sine comparator 118. The sine comparator 118 produces a sine output pulse 120 for as long as the sine sum exceeds a given predetermined level, as long as the sine sum signal 90 is positive, for example. The sine output pulse 120 is illustrated in FIG. 11. The demodulated cosine output 106 and demodulated inverse cosine output 108 are provided to a second differencing op-amp 122 which produces the cosine sum signal 91, and the cosine sum signal 91 is provided to a cosine comparator 124 which produces a cosine output pulse 126 for as long as the cosine sum signal 91 exceeds a given predetermined level, as long as the cosine sum signal 91 is positive for example. The cosine output pulse 126 is also illustrated in FIG. 11. Finally, a TDC comparator 130 receives the demodulated TDC output 110 and produces a TDC output pulse 134 as long as the TDC output 110 is above a predetermined level. The sine output pulse 120, the cosine output pulse 126 and the TDC output pulse 134 are also provided to the processor 114.

The processor 114 enables the angular position detector 8 to be used as both an analog resolver and a digital encoder. In the present embodiment having 12 teeth on the first ring 22 and 12 teeth on the second ring 36, a total of 24 pulses per rotor revolution are provided to the processor 114 in addition to the TDC output pulse 134. At high speeds, the TDC output pulse 134 alone may provide adequate information for the calculation of rotational speed. In addition, the 24 sine and cosine pulses per revolution allow the angular position of the rotor 10 to be determined with at least 15 degree accuracy using any conventional encoder algorithms. In addition, conventional digital encoder operations can be performed with the pulsed, encoder-like output signals. For greater positional accuracy, the digitized analog data from the demodulated sine output 102, demodulated inverse sine output 104, demodulated cosine output 106 and demodulated inverse cosine output 108 can be used to determine the angular position of the rotor 10 to accuracies of less than a degree, for example, by counting waveforms since the last TDC output pulse 134 and relating the angle of the demodulated sine signal 102, for example, to a lookup table that relates particular sine output angles to position of the rotor 10. Other calculations, such as calculations of a quotient of two of the outputs (e.g., an arctangent calculated by dividing an output from a "sine" sensor by an output of a "cosine" sensor) may provide a greater degree of accuracy in position determination. The angular position detector 8 thus combines benefits of analog resolvers and digital encoders and allows features of either conventional type of device to be provided by a single unit.

Beneficially, the rotor 10 and the sensors of the angular position detector 8 consist essentially of bodies of ferromagnetic material and wire. The rotor 10 and sensors do not contain semiconductor devices or optical components, such as lasers or glass, that would be adversely affected by either very high speed rotation or by radiation, including radiation of the type found in the vicinity of neutron chopper devices mentioned in the background of this application. The disclosed angular position detector is thus well suited for use in such environments and likely to last longer than certain conventional analog resolvers or digital encoders.

The present invention has been described herein in terms of presently preferred embodiments. However, additions and modifications to these embodiments will become apparent to those of ordinary skill in the art upon a reading of the foregoing disclosure. It is intended that all such additions and modification comprise a part of the invention to the extent they fall within the scope of the several claims appended hereto.

What is claimed is:

1. An angular position detector comprising:
    a cylindrical rotor having an axis of rotation, the cylindrical rotor further including a first ring comprising a plurality of alternating teeth and valleys,
    a first first-ring magnetic sensor having a sensor surface facing the first ring and spaced from the rotor by a first gap, the first first-ring magnetic sensor being configured to produce a first signal in response to movement of the first ring past the first first-ring magnetic sensor;
    a second first-ring magnetic sensor having a sensor surface facing the first ring and spaced from the rotor by a second gap, the second first-ring magnetic sensor being configured to produce a second signal in response to movement of the first ring past the second first-ring magnetic sensor, the second first-ring magnetic sensor being circumferentially offset from the first first-ring magnetic sensor by a first angle; and
    a controller operatively connected to the first and second first-ring magnetic sensors and configured to produce a first output signal based on the first and second signals
    wherein the rotor includes a second ring comprising a plurality of alternating teeth and valleys axially adjacent the first ring;
    the angular position detector further including:
    a first second-ring magnetic sensor facing the second ring and spaced from the second ring by a first space, the first second-ring magnetic sensor being configured to produce a third signal in response to movement of the second ring past the first second-ring magnetic sensor;
    a second second-ring magnetic sensor facing the second ring and spaced from the second ring by a second space, the second second-ring magnetic sensor being configured to produce a fourth signal in response to movement of the second ring past the second second-ring magnetic sensor, the second second-ring magnetic sensor being circumferentially offset from the first second-ring magnetic sensor by a second angle;
    wherein the controller is operatively connected to the first and second second-ring magnetic sensors, and
    wherein the plurality of teeth of the first ring are axially aligned with the plurality of valleys of the second ring.

2. The angular position detector according to claim 1, wherein each of the plurality of teeth has a first radially extending side wall and a second radially extending side wall.

3. An angular position detector comprising:
    a cylindrical rotor having an axis of rotation, the cylindrical rotor further including a first ring comprising a plurality of alternating teeth and valleys and a second ring comprising a plurality of alternating teeth and valleys axially adjacent the first ring, and a third ring comprising a target;
    a first first-ring magnetic sensor having a sensor surface facing the first ring and spaced from the rotor by a first gap, the first first-ring magnetic sensor being configured to produce a first signal in response to movement of the first ring past the first first-ring magnetic sensor;
    a second first-ring magnetic sensor having a sensor surface facing the first ring and spaced from the rotor by a second gap, the second first-ring magnetic sensor being configured to produce a second signal in response to movement of the first ring past the second first-ring magnetic sensor, the second first-ring magnetic sensor being circumferentially offset from the first first-ring magnetic sensor by about 180°;
    a first second-ring magnetic sensor facing the second ring and spaced from the second ring by a first space, the first second-ring magnetic sensor being configured to produce a third signal in response to movement of the second ring past the first second-ring magnetic sensor;
    a second second-ring magnetic sensor facing the second ring and spaced from the second ring by a second space, the second second-ring magnetic sensor being configured to produce a fourth signal in response to movement of the second ring past the second second-ring magnetic sensor, the second second-ring magnetic sensor being circumferentially offset from the first second-ring magnetic sensor by about 180 degrees;
    a first third-ring sensor facing the third ring; and
    a controller operatively connected to the first and second first-ring magnetic sensors and to the first and second second-ring magnetic sensors and to the first third-ring magnetic sensor,
    wherein the controller is configured to produce a first output signal based on a first pair of the first, second, third and fourth signals and a second output signal based on a second pair of the first, second, third and fourth signals, and
    wherein the rotor and the first and second first-ring magnetic sensors and the first and second second-ring magnetic sensors are configured such that in the presence of constant angular motion of the first and second rings a sum or difference of the first and second output signals remains constant independently of changes in the first signal or the second signal or the third signal or the fourth signal.

4. The angular position detector according to claim 3, wherein the first output signal is based on a sum or difference of the first signal and the fourth signal and the second output signal is based on a sum or difference of the second and third signal.

5. The angular position detector according to claim 3, wherein the first output signal is based on a sum or difference of the first signal and the third signal and the second output signal is based on a sum or difference of the second and fourth signal.

6. The angular position detector according to claim 3,
wherein each of the plurality of teeth of the first ring has a length in a circumferential direction and each of the plurality of valleys of the first ring has the same length in the circumferential direction, wherein a maximum width of the first sensor surface in a plane perpendicular to the axis of rotation is substantially the same as the length in the circumferential of each of the plurality of teeth, and
wherein the rotor has a cylindrical outer surface at locations outside the first ring and the second ring, and wherein the plurality of teeth are flush with the cylindrical outer surface of the rotor and the plurality of valleys are inset relative to the cylindrical outer surface.

7. The angular position detector according to claim 5, including an analog to digital converter for producing a first pulsed output signal based on the first output signal.

* * * * *